Patented Oct. 8, 1935

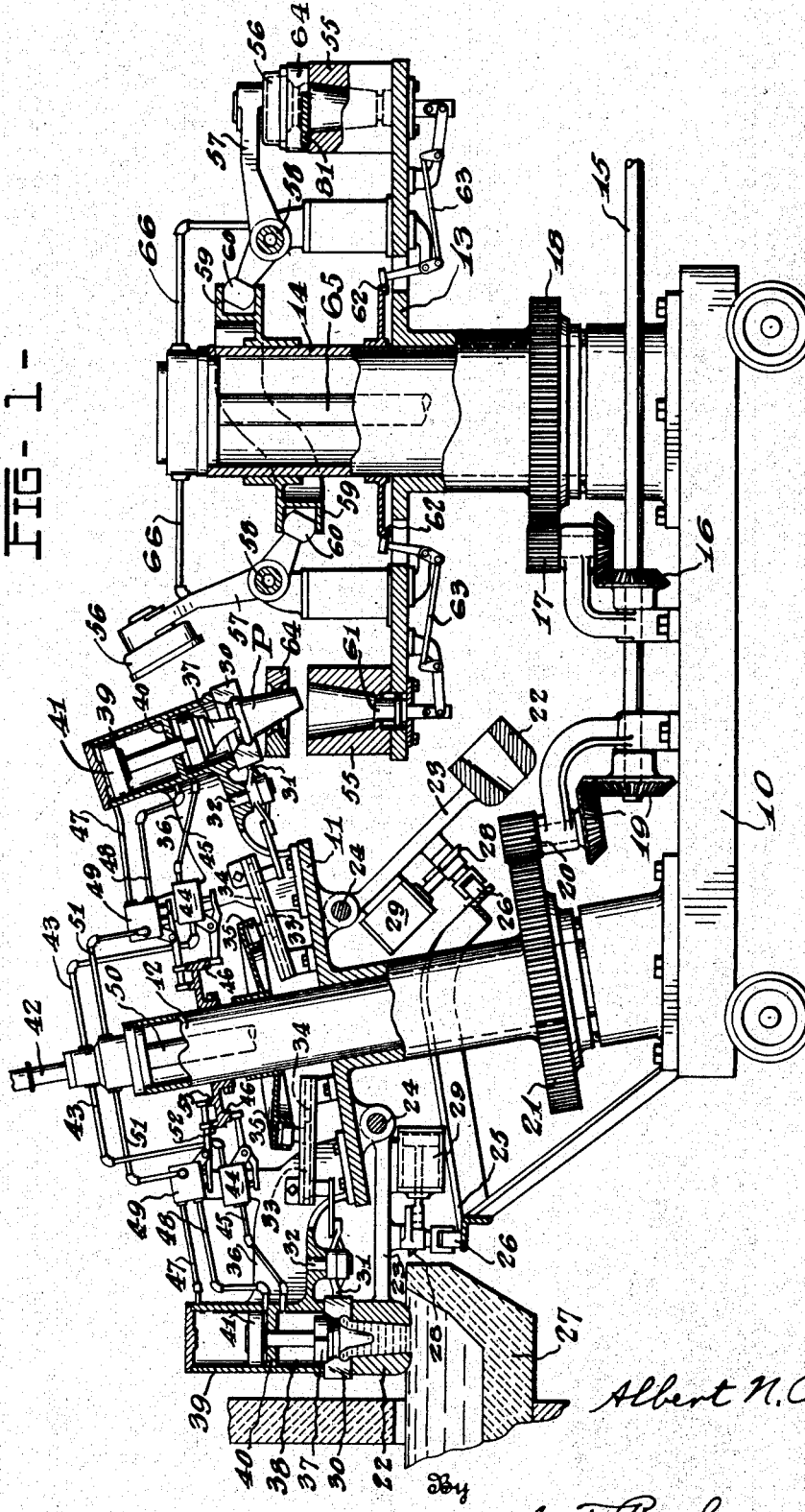

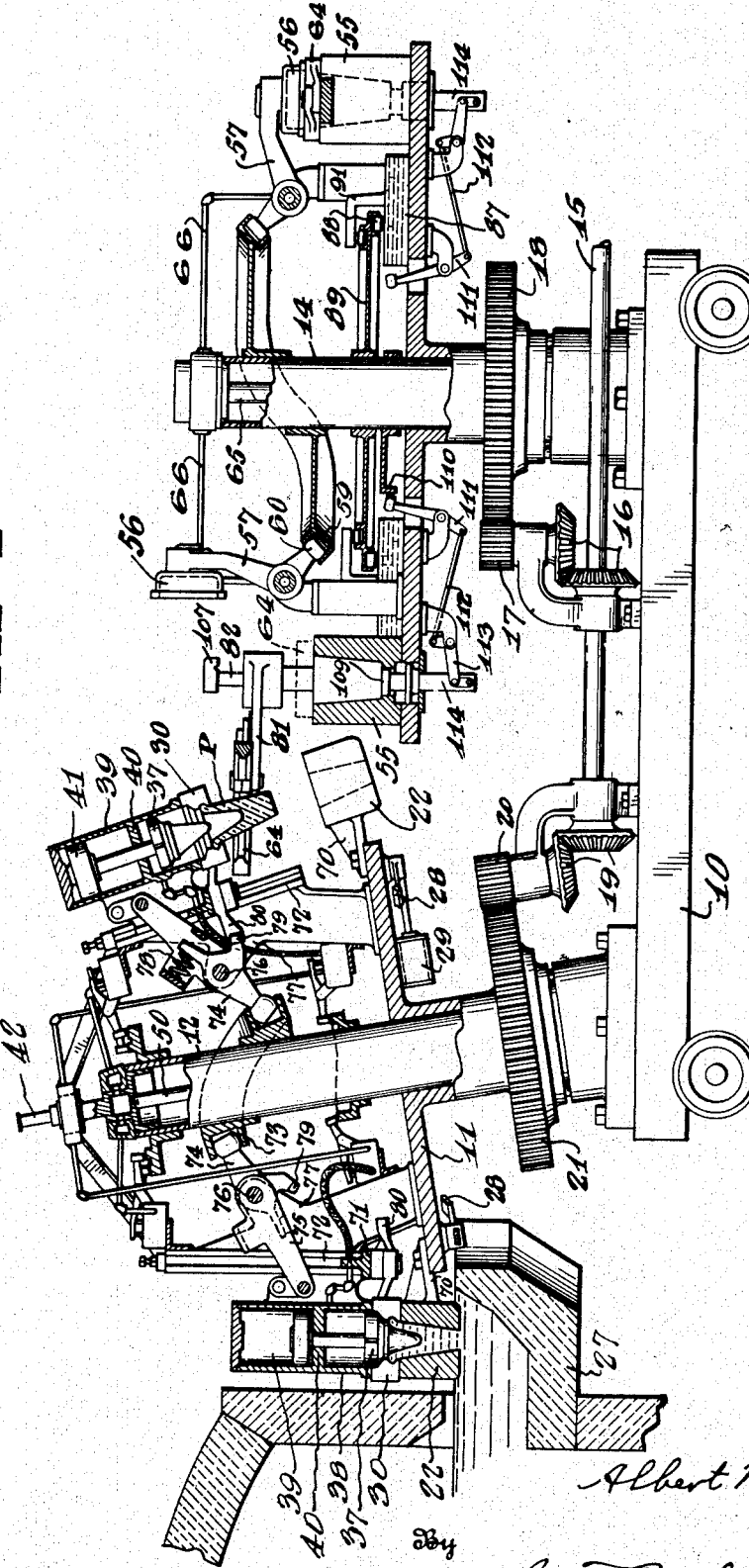

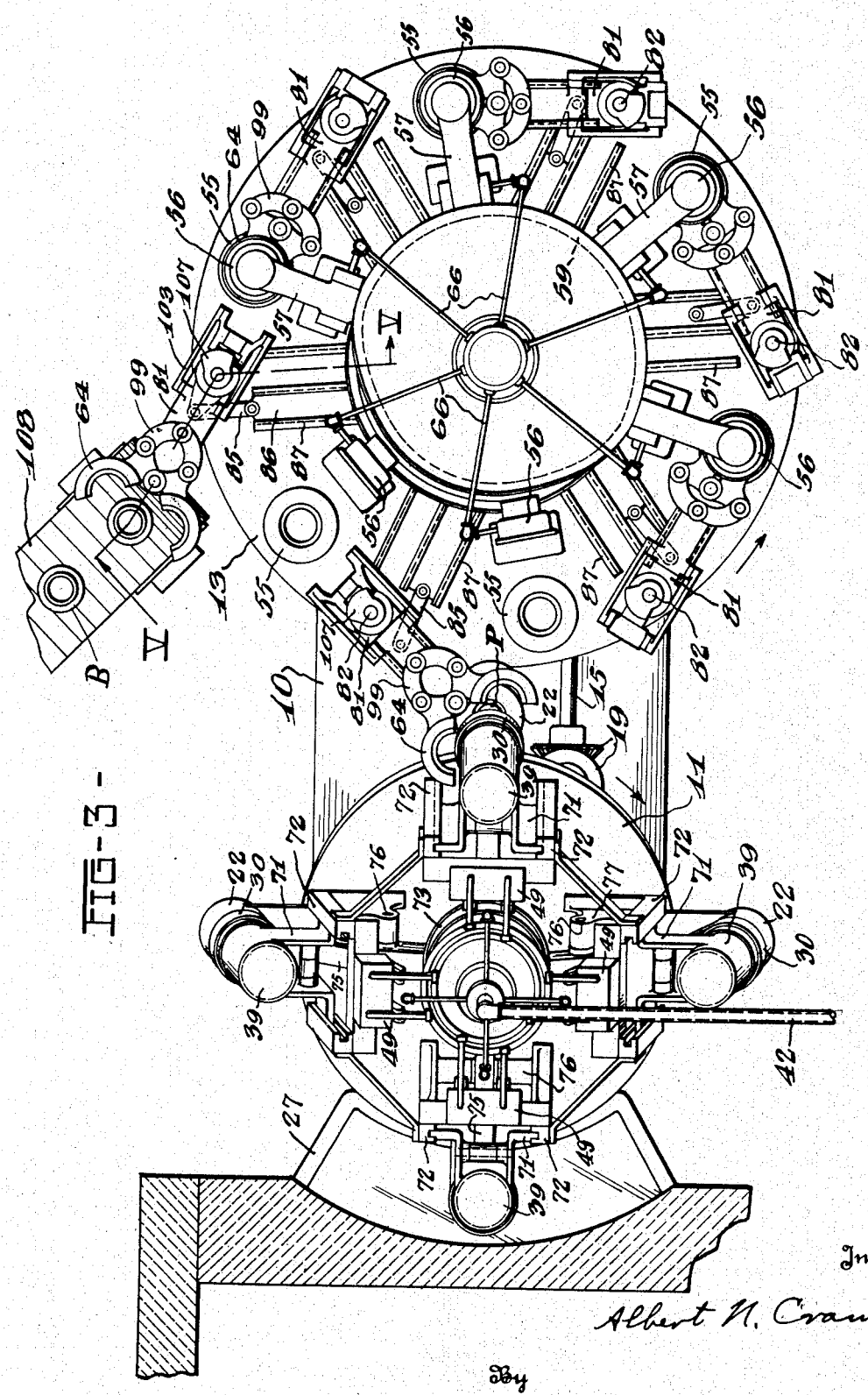

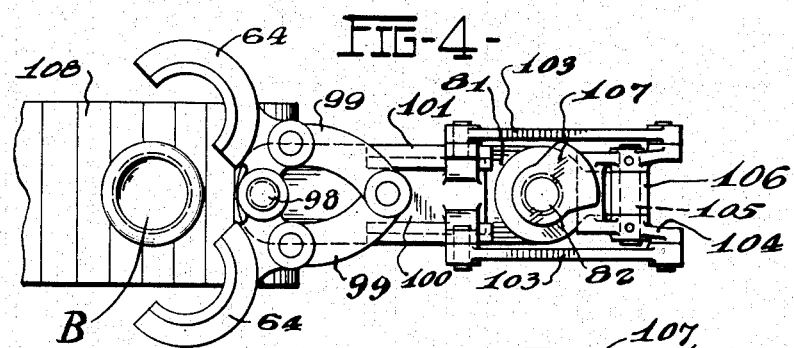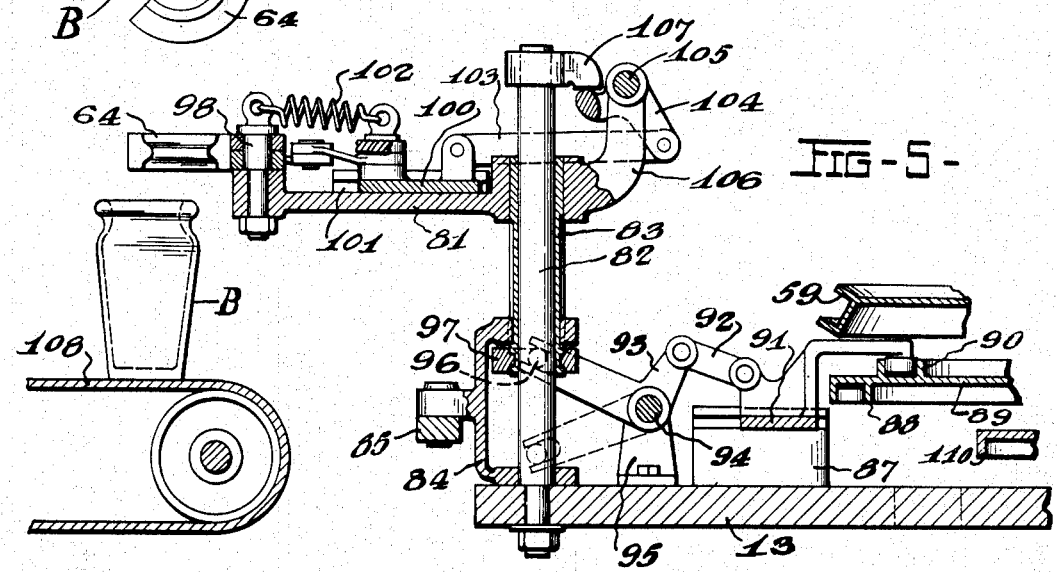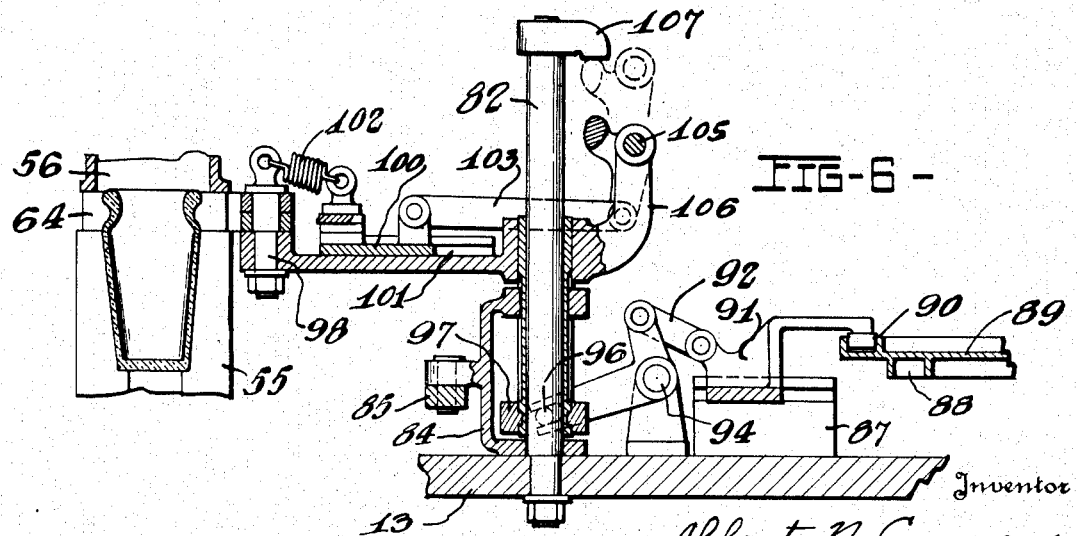

2,016,360

UNITED STATES PATENT OFFICE 2,016,360

MACHINE FOR FORMING TUMBLERS AND OTHER GLASS ARTICLES

Albert N. Cramer, Toledo, Ohio, assignor, by mesne assignments, to Owens-Illinois Glass Company, Toledo, Ohio, a corporation of Ohio Application December 6, 1933, Serial No. 701,108

11 Claims. (Cl. 49—5)

My invention relates to machines for blowing tumblers and various other glass articles in molds and, more particularly, to machines of the type in which the charges of glass are gathered by suction from a pool or supply body of molten glass into a parison mold and the parisons later transferred to finishing molds in which they are further blown.

An object of the invention is to provide a machine of the character indicated in which the blank molds are mounted to rotate with a mold carriage about an inclined axis and are thereby periodically brought into position to gather their charges by suction from the pool of molten glass, the parisons being transferred to finishing molds on a horizontally rotating finishing mold carriage.

A further object of the invention is to provide a machine in which the mold carriages are rotated continuously, in combination with a novel form of transfer mechanism by which the parisons are transferred from the parison molds to the finishing molds.

A further object of the invention is to provide a machine by which tumblers of high quality may be produced by the suction gathering method.

Other objects of the invention will appear hereinafter.

In the accompanying drawings:

Fig. 1 is a sectional elevation of a machine constructed in accordance with the present invention.

Fig. 2 is a sectional elevation of a modified form of machine.

Fig. 3 is a top plan view of the machine shown in Fig. 2.

Fig. 4 is a plan view of the transfer mechanism.

Fig. 5 is a part sectional elevation of the transfer mechanism, the view being taken at the line V—V on Fig. 3.

Fig. 6 is a view similar to Fig. 5, but with the parts in a different relative position.

Referring particularly to Fig. 1, the machine is mounted on a wheeled base or platform 10. A parison mold table or carriage 11 is mounted on a stationary inclined column 12 for continuous rotation about the axis of said column. A finishing mold table or carriage 13 is mounted on a stationary vertical column 14 for rotation about the vertical axis of said column. The mold carriages are driven from any suitable source of power (not shown), the power being transmitted through a drive shaft 15. Motion is transmitted from the shaft 15 through gears 16, 17 and 18 to the finishing mold carriage 13. Motion is transmitted through gears 19, 20 and 21 to the parison mold carriage 11. The gearing is arranged to rotate the mold carriages in opposite directions about their axes so that the adjacent portions of the carriages are moving in the same, or approximately the same, direction.

A series of body blank molds 22 are mounted on the carriage 11 for rotation therewith and for up and down swinging movement, each said mold being carried at the outer end of an arm 23 which swings up and down about a pivot 24 by which the arm is connected to the mold carriage. The up and down movements of the molds 22 are controlled by a stationary cam track 25 surrounding the column 12 and on which run rolls 26 carried by the arms 23. The charges of glass are gathered from a pool or supply body of molten glass within a tank or container 27. Each arm 23 carries a knife 28 and an air motor 29 for actuating the knife.

Each parison mold comprises, in addition to the body mold 22, a split ring mold 30 above and in register with the body mold during the formation of a parison, the ring mold serving to form a bead, neck or finish on the upper end of the parison. Each ring mold 30 is carried on a pair of arms 31 mounted to swing about a pivot pin 32 on a bracket arm 36 bolted to the mold table. The mold arms 31 have a link connection with a slide block 33 which reciprocates radially of the mold carriage in guides 34, the movements of the slide block being controlled by a stationary cam 35 mounted on the column 12.

A plunger 37 is mounted to reciprocate up and down in a cylindrical head 39 mounted on or forming part of the arm 36. The head 39 provides a vacuum chamber 38 in which the plunger operates and is extended upward above said chamber to form an air pressure cylinder, said chamber an cylinder being separated by a partition 40. The stem of the plunger extends upward through the partition 40 and carries a piston 41 working in said cylinder.

A vacuum pipe 42 is connected through branch pipes 43, valves 44 and pipes 45 to the vacuum chambers 38. The exhaustion of air from the vacuum chambers is controlled by a stationary cam 46 which actuates the valves 44. Air pressure is supplied to the cylinders 39 above and below the pistons 41 through pipes 47 and 48, respectively, leading to valve boxes 49. The air pressure is supplied from a pressure pipe 50 extending through the column 12 to branch pipes 51 leading to the valve boxes 49. Stationary cams 52 and 53 operate through levers to open and close the valves within the valve boxes 49 for controlling the air supply through the pipes 47 and 48, respectively.

The finishing mold carriage has mounted thereon an annular series of finishing molds each comprising a body mold 55 and a split ring mold 64. Blowing heads 56 individual to the finishing molds are mounted on arms 57 to swing up and down about pivots 58, under the control of a stationary cam track 59 on which run rolls 60 connected to the blow mold arms 57. Finishing mold bottoms 61 are moved up and down by means of a stationary cam 62 mounted on the column 14, said cam operating through lever and link connections 63 to lift and lower the mold bottoms.

The operation of the machine shown in Fig. 1 will now be described, by following particularly the operations in connection with a single parison mold and cooperating parts. The mold carriages are rotated continuously in opposite directions by power transmitted through the drive shaft 15. Each parison mold, comprising a combined body mold 22 and ring mold 30, as it travels over the tank 27 is lowered into sealing contact with the glass owing to the inclination of the carriage. The associated plunger 37 is at this time in its lowered position in which it projects downward into the mold. As soon as the mold makes sealing contact with the glass, the stationary cam 46 operates to open the valve 44, thereby exhausting the air from the chamber 38 and causing the mold to be filled by suction. As the finishing mold leaves the glass, the air motor 29 swings the knife 28 across the bottom of the mold and severs the charge from the supply body. As the mold will the charge of glass therein approaches the transfer position between the two mold carriages, the body mold 22 swings downward, leaving the bare parison P suspended from the ring 30. Before the parison reaches the transfer position, the plunger 37 is withdrawn by means of air pressure supplied beneath the piston 41 under the control of the valve actuated by the cam 53. When the parison reaches the transfer position, which may be directly between and in line with the axes of the mold carriages, the transfer ring 64 closes about the parison. At the same time, the ring 30 opens, releasing the parison so that it drops to a vertical position in which it is suspended from the ring 64. The latter then moves downward to seat on the body finishing mold 55, thereby positioning the parison within the finishing mold (including the body mold 55 and ring mold 64). As the parison travels with the finishing mold, the blow head 56 is lowered by its cam 59 to seat on the ring 64 or rim of the parison. A valve (not shown) within the blowing head is opened in the usual manner to supply air pressure for blowing the parison in the finishing mold. The air pressure line comprises a pipe 65 within the column 14 and branch pipes 66 leading therefrom to the hollow pivot shafts 58 and from said shafts through the arms 57 to the blow heads. After the article has been blown in the finishing mold, the blowing head is lifted by its cam. After this, the transfer ring 64 operates in the manner hereinafter described to transfer the blown article from the mold to a conveyor.

Figs. 2 and 3 illustrate a modified construction in which the body blank molds 22 have a fixed mounting on the mold carriage 11, being attached thereto by means of bracket arms 70. In this construction, the ring mold 30 and plunger cylinder 39 are mounted on a supporting frame or head 71 which is slidable up and down in guideways 72 formed in a frame 77 on the mold carriage. The guideways 72 and axis of the corresponding parison mold are parallel, both being preferably inclined to the axis of the mold carriage at such an angle that when the parison mold is in charge gathering position the mold and guides are substantially vertical.

The mold carrying head 71 is moved up and down relative to the mold carriage under the control of a stationary cam 73 mounted on the center column 12. The cam operates through a pair of lever arms 74 and 75 mounted on a pivot pin 76 on the bracket 77. The arms 74 and 75 are yieldingly held in a predetermined relative position by a coil spring 78. The lever 74, 75 operates to lift the head 71 and with it the plunger and its cylinder 39 after the parison has been formed in the mold, thereby withdrawing the parison P from the body mold 22. As the ring mold 30 with the bare parison suspended therefrom, approaches the transfer position and while held at the limit of its upward movement, the lever arm 74 is given an additional movement about its pivot, compressing the spring 78 and forcing a wedge 79 carried thereby, between pivoted arms 80 which carry the sectional ring 30, thereby opening said ring and releasing the parison to the transfer ring 64.

The parison transfer mechanism will now be described. Transfer devices individual to the finishing molds 55 are carried on the finishing mold table 13. Each said device comprises a horizontally disposed transfer arm 81 mounted for up and down movement on a post 82 and also for horizontal oscillation about the axis of said post. The post is fixed to the mold table. The arm 81 is fixed to a bearing sleeve 83 mounted to oscillate on the post 82 and also slidable up and down on the post. The means for oscillating the arm 81 includes a yoke 84, the lower end of which is journaled on the post and the upper end of which has a splined connection with the sleeve 83, permitting said sleeve to move up and down therein but causing the sleeve to turn with the yoke when the latter is rocked or oscillated about the axis of the post. Rocking movement is imparted to the yoke by means including a link 85 pivoted at one end to the yoke and at the other end to a slide block 86 (see Fig. 3) which is mounted in guides 87 for sliding movement in a direction substantially radial to the mold carriage. The movements of the slide block 86 are controlled by a stationary cam track 88 formed on the lower face of a cam plate 89 fixed to the center column 14. A cam track 90 on the upper face of the plate 89 controls the up and down movements of the transfer arm through mechanism including a slide block 91 mounted to reciprocate in guides on the block 87. A link 92 connects the slide block 91 with a bell crank lever 93 pivoted at 94 on a bracket 95 bolted to the table 13. The free end of the bell crank 93 is forked to straddle a pin 96 on a collar 97. Said collar is mounted on the lower end of the sleeve 83, the latter being free to rotate in the collar. It will be seen that with this construction the bell crank 93 when rocked about its pivot will impart up and down movement to the sleeve 83 and transfer arm 81 carried thereby.

The transfer ring 64 comprises sections which swing about a pivot pin 98 at the outer end of the arm 81. Links 99 connect the ring sections to a slide plate 100 mounted to reciprocate longitudinally of the arm 81 in guides 101. The sections of the ring 64 are held together by a coil spring 75

102 anchored at one end to the slide plate 100 and at its other end to the pivot pin 98. A pair of links 103 are pivoted at their opposite ends respectively to the slide plate 100 and to a yoke 104 having a horizontal pivot 105 at the upper end of an arm 106 extending upwardly from the transfer arm 81. A stop 107 fixed to the upper end of the post 82 is positioned in the path of the inner end of the yoke 104 and engages the latter when the arm 81 is lifted as shown in Fig. 5, thereby rocking the yoke 104 and through the links 103 moving the slide 100 against the tension of the spring 102, thereby opening the ring 64.

The operation of the transfer mechanism may be described as follows: As a parison P carried by the ring 30 approaches the transfer position between the mold carriages, the corresponding transfer ring 64 is brought by the finishing mold carriage into position to straddle the bare parison, the transfer arm 81 at this time being held in its outward position by means of the cam 88, as shown in Fig. 3. The transfer arm as it approaches the transfer station is held by the cam 90 in its uppermost position so that the transfer ring 64 is held open by the stop 107. As the transfer point is reached, the cam 90 operates to lower the arm 81 a short distance, permitting the spring 102 to close the transfer ring 64, the ring 30 at the same time being opened to release the parison so that the latter drops into the closed ring 64 and is supported by engagement of said ring with the bead on the upper end of the parison. The cam 88 now operates through the link 85 to rock the yoke 84 and thereby swing the transfer arm inward about the post 82 so that the parison is brought to a position above the body finishing mold 55. The arm 81 in this inner position is now lowered until it rests on the mold 55 with the parison positioned in the mold. The blowing head 56 is then lowered by its cam 59 so that it rests upon the ring 64 and operates to blow the parison in the finishing mold comprising the body mold 55 and the ring mold 64.

After the parison has been blown to final form and the air pressure maintained the desired length of time, the blowing head 56 is lifted, after which the transfer arm operates to transfer the blown article B to a conveyor 108. This transfer operation comprises lifting of the arm 81 by means of the cam 90 to an intermediate position, thereby lifting the article B out of the body mold 55. The cam 88 then operates to swing the arm 81 outward and carry the suspended article outward beyond the mold table. This movement together with the rotation of the mold table brings the article to a discharging position over the conveyor. As the article is brought to this position, the arm 81 is given a final upward movement during which the stop 107 operates to open the ring 64, thereby releasing the article so that it drops onto the conveyor.

In order to assist the transfer arm in lifting the blown article from the mold 55, the latter may be provided with a vertically movable bottom 109. This mold bottom is lifted by means of a stationary cam 110 operating through a lever 111, link 112 and bell crank 113, the latter connected through a link to the stem 114 of the mold bottom. The cam 110 may be designed to lift the mold bottom concurrently with the lifting of the parison by the transfer arm, thus releasing the article from the mold if there is any tendency for it to stick therein, and supporting the article during the lifting movement so that distortion is prevented.

Modifications may be resorted to within the spirit and scope of my invention.

What I claim is:

1. The combination of a container for a pool of molten glass, a mold carriage, a parison mold thereon comprising a body mold and a ring mold above and in register with the body mold, means for rotating the mold carriage about an inclined axis and thereby bringing the parison mold periodically over the pool and lowering it to a charge gathering position, means for gathering a charge of glass by suction into the parison mold, said body mold having a fixed mounting on the mold carriage, and means for moving the ring mold upward away from the body mold and causing it to withdraw the parison from the body mold.

2. The combination of a mold carriage, an annular series of body molds mounted thereon, each having a fixed position on the mold carriage, a container for a supply body of molten glass, means for rotating the mold carriage about an axis inclined toward the container and thereby bringing said molds in succession over the container and lowering them to a gathering position, means for filling the molds by suction, and means for withdrawing the parisons formed in the molds.

3. The combination of a mold carriage, an annular series of body molds mounted thereon, each having a fixed position on the mold carriage, a container for a supply body of molten glass, means for rotating the mold carriage about an axis inclined toward the container and thereby bringing said molds in succession over the container and lowering them to a gathering position, means for filling the molds by suction, ring molds individual to the body molds and movable into register therewith to form parison molds, and means for withdrawing the ring molds in an upward direction and thereby withdrawing the parisons from the body molds.

4. The combination of a mold carriage, an annular series of body molds mounted thereon, each having a fixed position on the mold carriage, a container for a supply body of molten glass, means for rotating the mold carriage about an inclined axis and thereby bringing said molds in succession over the container and lowering them to a charge gathering position, means for filling the molds by suction, ring molds individual to the body molds and movable into register therewith to form parison molds, means for withdrawing the ring molds in an upward direction and thereby withdrawing the parisons from the body molds, each said ring mold comprising separable sections, transfer devices, and means for separating said ring mold sections and thereby releasing the parisons to the transfer devices.

5. The combination of a mold carriage, an annular series of body molds mounted thereon, each having a fixed position on the mold carriage, a container for a supply body of molten glass, means for rotating the mold carriage and bringing said molds in succession to a gathering position over the container, means for filling the molds by suction, ring molds individual to the body molds and movable into register therewith to form parison molds, means for rotating the mold carriage and bringing the parison molds in succession to a charge gathering position over the supply body of glass, means for drawing charges of glass by suction into the molds, a stationary cam, levers individual to the ring molds and actuated by said cam, operating connections between the levers and ring molds for lifting the ring molds and thereby withdrawing the parisons from the body molds, and means actuated by said levers for releasing the parisons from the ring molds.

6. The combination of a container for a pool of molten glass, a mold carriage, a solid or non-split mold on the carriage, means for rotating the carriage about an inclined axis and thereby bringing the mold periodically to a gathering position over the glass in the container, means for drawing a charge of glass by suction into said mold, means cooperating with the mold to form a parison, and means to withdraw the parison in an endwise direction from said mold.

7. The combination of a container for a pool of molten glass, a mold carriage, a solid or non-split mold on the carriage, means for rotating the carriage about an inclined axis and thereby bringing the mold periodically to a gathering position over the glass in the container, means for drawing a charge of glass by suction into said mold, means cooperating with the mold to form a parison, and means for withdrawing the bare parison upwardly from the mold while the latter is at a position remote from the said container.

8. The combination of a mold carriage, means for rotating it, a mold, an arm carrying the mold, said arm and mold being connected to rotate with the carriage, means for swinging said arm and mold up and down on the mold carriage, a container for a supply body of molten glass, said mold being brought by the rotation of the carriage to a gathering position over said pool, means for introducing a charge of glass by suction into the mold, a knife mounted on said arm to swing up and down with the mold, and means for actuating said knife.

9. The combination of a container for molten glass, a mold carriage mounted for rotation about an inclined axis, an arm pivoted at one end to the mold carriage, a gathering mold at the free end of said arm and carried over the container as the mold carriage rotates, means for swinging said arm up and down about its pivot, said arm and mold being held in their upward position relative to the carriage while the mold is passing over the said container, means for drawing a charge of glass by suction into the mold, and a knife and knife operating mechanism mounted on said arm and operable to sever the glass in the mold from the supply body.

10. The combination of a container for molten glass, a mold carriage mounted for rotation about an inclined axis, an arm pivoted at one end to the mold carriage, a gathering mold at the free end of said arm and carried over the container as the mold carriage rotates, means for swinging said arm up and down about its pivot, said arm and mold being held in their upward position relative to the carriage while the mold is passing over the said container, means for drawing a charge of glass by suction into the mold and forming a parison therein, and means for supporting the parison and causing the mold as it swings down to be withdrawn from the parison.

11. The combination of a container for molten glass, a mold carriage mounted for rotation about an inclined axis, an arm pivoted at one end to the mold carriage, a gathering mold at the free end of said arm and carried over the container as the mold carriage rotates, means for swinging said arm up and down about its pivot including a stationary cam track, said track arranged to hold the mold in its upwardly swung position while it travels over the said container, means for introducing a charge of glass by suction into the mold from the supply body in the container, means cooperating with the mold to form a parison therein, and means for supporting the parison while said arm and mold swing downward away from the parison.

ALBERT N. CRAMER.